United States Patent [19]

Kawamura et al.

[11] Patent Number: 5,065,333

[45] Date of Patent: Nov. 12, 1991

[54] METHOD OF INVOLUTE INTERPOLATION IN THREE DIMENSIONS

[75] Inventors: Hideaki Kawamura, Hachioji; Kentaro Fujibayashi, Musashino; Masafumi Sano, Minamitsuru, all of Japan

[73] Assignee: Fanuc Ltd., Minamitsuru, Japan

[21] Appl. No.: 408,501

[22] PCT Filed: Jan. 6, 1989

[86] PCT No.: PCT/JP89/00006

§ 371 Date: Aug. 21, 1989

§ 102(e) Date: Aug. 21, 1989

[87] PCT Pub. No.: WO89/06392

PCT Pub. Date: Jul. 13, 1989

[30] Foreign Application Priority Data

Jan. 8, 1988 [JP] Japan .................................. 63-002144

[51] Int. Cl.$^5$ ............................................. G05B 19/403
[52] U.S. Cl. ................................ 364/474.31; 318/573; 364/474.36
[58] Field of Search ..................... 364/474.29, 474.31, 364/474.36; 318/573; 51/287, 123 G

[56] References Cited

U.S. PATENT DOCUMENTS

| Re. 28,766 | 4/1976 | Villano | 409/80 |
| 3,714,865 | 2/1973 | Villano | 318/573 X |
| 3,763,363 | 10/1973 | Saita et al. | 364/718 |
| 3,766,369 | 10/1973 | Watanabe et al. | 364/474.31 X |
| 4,381,608 | 5/1983 | Thormann et al. | 33/1 MP |
| 4,922,741 | 5/1990 | Bridges et al. | 72/371 X |
| 4,935,681 | 6/1990 | Kawamura et al. | 318/569 |

Primary Examiner—Joseph Ruggiero
Attorney, Agent, or Firm—Staas & Halsey

[57] ABSTRACT

An involute interpolation method for a computerized numerical control apparatus having a rotational axis and a linear axis is effected by giving commands for a direction in which an involute curve (ICl) rotates, the position of the center of a base circle (BC), the radius (R) of the base circle, and a Z-axis, and interpolating the involute curve (ICl) and the Z-axis according to the commands. Interpolated distances are converted to those along the rotational axis, the linear axis, and the Z-axis for the control of a machine tool (9).

6 Claims, 3 Drawing Sheets

METHOD OF INVOLUTE INTERPOLATION IN THREE DIMENSIONS

CROSS-REFERENCE TO RELATED APPLICATIONS

This application is cross-referenced to U.S. application Ser. Nos. 07/309,669, 07/309,664 and 07/397,462.

BACKGROUND OF THE INVENTION

1. Field of the Invention

The present invention relates to a method of involute interpolation for a computerized numerical control apparatus having a rotational axis and a linear axis, and more particularly to a method of involute interpolation for interpolating an involute curve and a Z-axis in synchronism with each other.

2. Description of Related Art

There is a great need for the interpolation of involute curves in computerized numerical control apparatus or the like in order to machine gears, pump impellers, or the like. It has been general practice to interpolate an involute curve with a computer or an NC programming device separate from a numerical control apparatus, convert the interpolated data to linear data on a tape, and machine a workpiece under numerical control using the tape.

The applicant has proposed an involute interpolation method by which an involute curve can easily be interpolated with commands in an orthogonal coordinate system within a computerized numerical control (CNC) apparatus (see Japanese Patent Application No. 62-157303).

The machine coordinate system of a three-axis lathe or a cam grinding machine having a C-axis is a polar coordinate system. There, an involute interpolation method which employs an orthogonal coordinate system cannot be applied to these machines.

For machining a cam or a gear, it is necessary to interpolate an involute curve in one plane, and provide a curved plane which moves in a direction normal to that plane.

SUMMARY OF THE INVENTION

In view of the aforesaid drawback of the earlier involute interpolation method, it is an object of the present invention to provide an involute interpolation method for interpolating an involute curve and a Z-axis in synchronism with each other.

To achieve the above object, there is provided in accordance with the present invention an involute interpolation method for a computerized numerical control apparatus having a rotational axis and a linear axis, comprising the steps of giving commands for a direction in which an involute curve rotates, the position of the center of a base circle, the radius (R) of the base circle, and a Z-axis. The next step is to polate the involute curve and the Z-axis according to the commands. Lastly, position along the rotational axis, the linear axis, and the Z-axis of a machine are controlled.

The commands for the involute curve and the Z-axis are interpolated on the rotational and linear axes, and simultaneously on the Z-axis. Synchronously with this, the Z-axis is interpolated for three-dimensional interpolation. The interpolated distances are converted to those on the rotational, linear, and Z-axes for the control of a machine tool.

DESCRIPTION OF THE PREFERRED EMBODIMENTS

An embodiment of the present invention will hereinafter be described with reference to the drawings.

Figure 3:
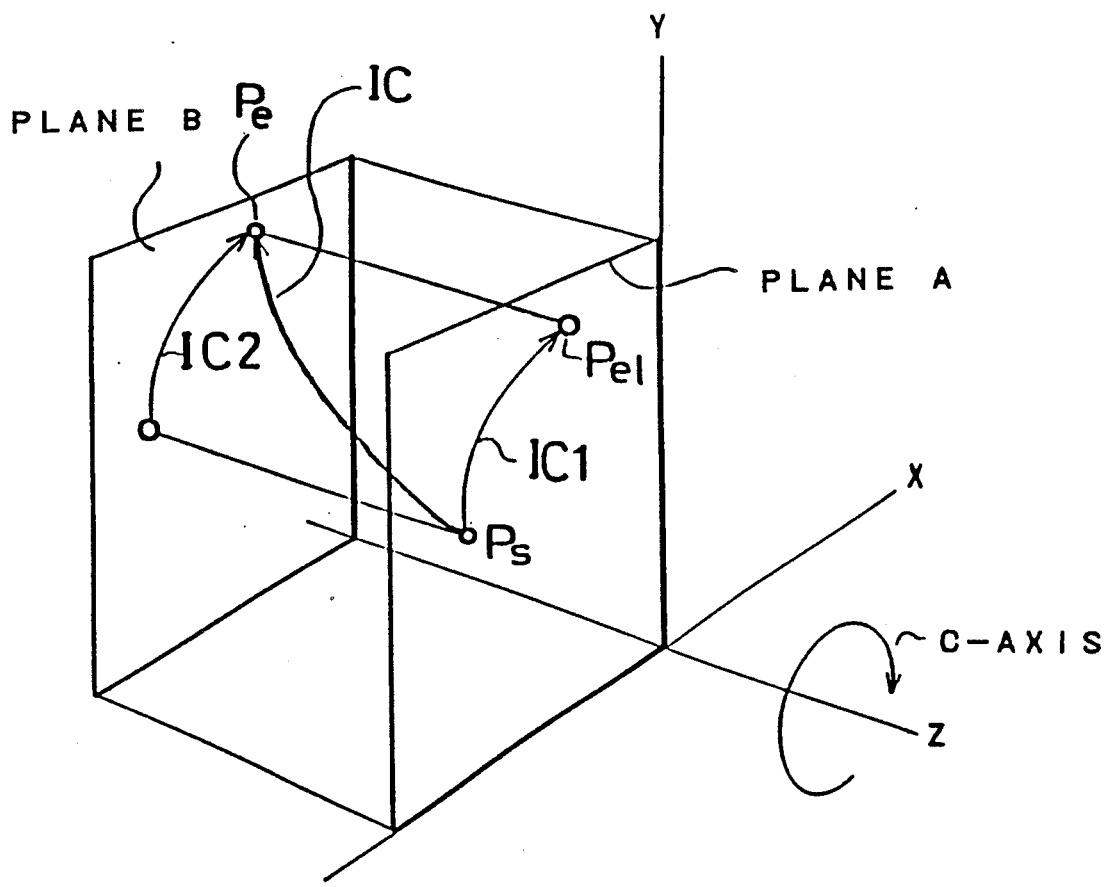
FIG. 3 is a diagram showing the relationship between an orthogonal coordinate system and a polar coordinate system.

FIG. 3 shows the relationship between an orthogonal coordinate system and a polar coordinate system of a machine having a linear axis and a rotational axis, such as a three-axis lathe or the like. An X-axis represents the direction of a cross slide, and a Z-axis is the same as the direction of the axis of a spindle. The machine has a radial linear axis, a Z-axis, and a C-axis which is a rotational axis around the Z-axis.

A program employs X- and Y-axes, and gives commands for an involute curve on the XY plane. The commands and movement of the machine are the same along the Z-axis. Therefore, the program for an involute curve is commanded on the XY plane, and is interpolated in the coordinate system on the XY plane. Interpolation pulses are converted to pulses in a polar coordinate system, i.e., on an r-c plane, and servomotors are driven by the converted pulses to control the machine. The program and actual movement are the same with respect to the Z-axis. On the Z-axis, a distance of movement may be interpolated in proportion to a small movement of the involute curve on the XY plane, or may be controlled such that the speed along the Z-axis will be proportional to the tangential speed of the involute curve on the XY plane.

In FIG. 3, Ps is a starting point of an involute curve, the XY plane which contains the starting point Ps being indicated as a plane A, and at Pe is an ending point of the involute curve, the XY plane which contains the ending point Pe being indicated as a plane B. The involute curve on the plane A is represented by IC1, and the involute curve on the plane B by IC2. The involute curves IC1 and IC2 are the same as each other. A desired three-dimensional involute curve IC can be obtained by interpolating the involute curve IC1, while at the same time interpolating commands along the Z-axis in synchronism therewith.

Figure 1:
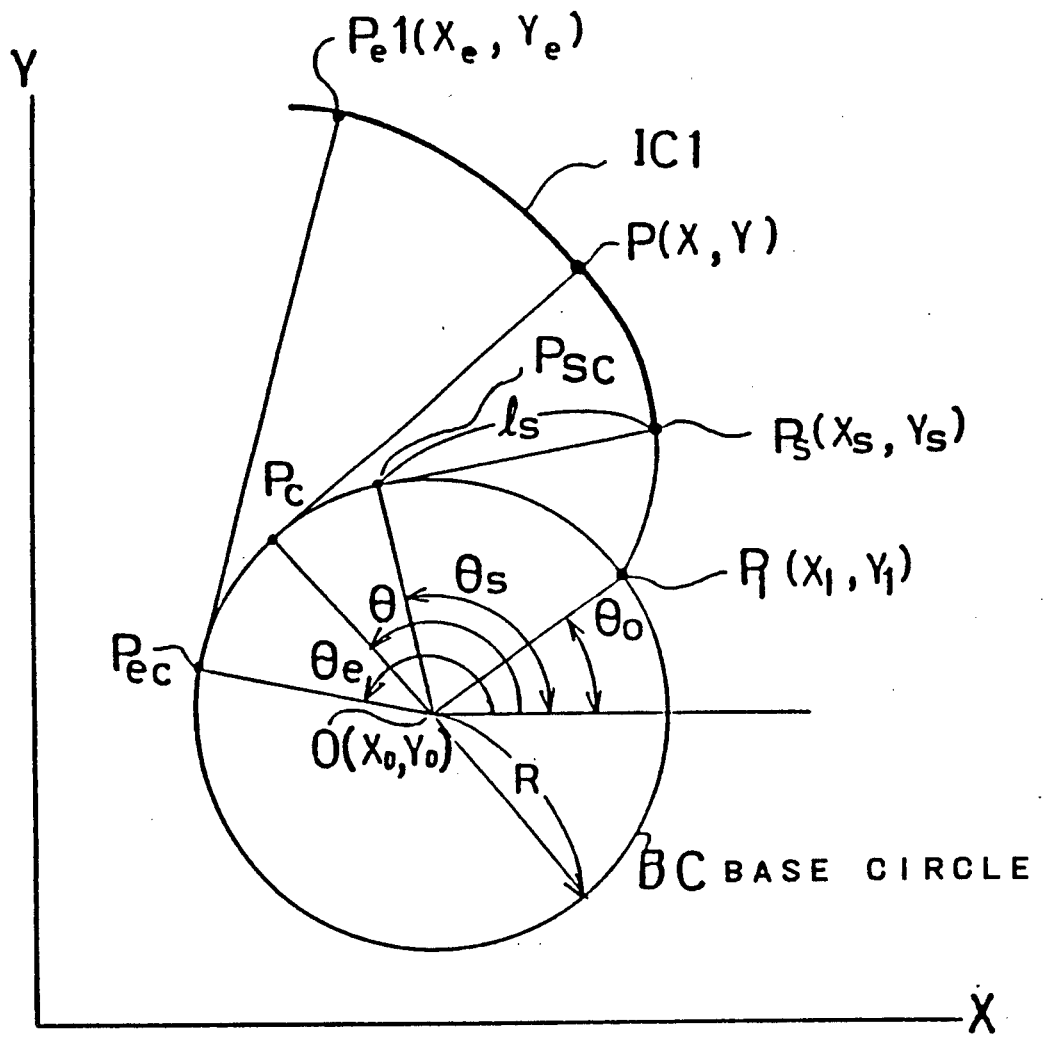
FIG. 1 is a diagram of an involute curve to be interpolated according to an embodiment of the present invention.

Actual commands and interpolation of an involute curve will be described below. FIG. 1 shows, by way of example, an involute curve to be interpolated according to the embodiment of the present invention. The illustrated curve is the same as the involute curve IC1 on the plane A shown in FIG. 3, except that the involute curve is shown as curved in the opposite direction in FIG. 1. As described above, the involute curve is commanded as an involute curve on the XY plane. BC represents the base circle of the involute curve with its center having coordinates O $(X_0, Y_0)$, and R indicates the radius of the base circle.

The involute curve IC1 is an involute curve which is to be interpolated, and starts at a point $P_1$ $(X_1, Y_1)$. A line interconnecting the point $P_1$ and the center O forms an angle $\Theta_0$ with the X-axis.

A necessary interpolated involute curve is an involute curve to be interpolated from a starting point Ps (Xs, Ys) on the involute curve IC1 to an ending point Pel (Xe, Ye).

Now, a line is drawn from the point Ps (Xs, Ys) tangentially to the base circle BC at a point Psc. A line interconnecting the point Psc thereon and the center O forms an angle $\Theta s$ with the X-axis. Likewise, a line is drawn from the point Pel (Xe, Ye) tangentially to the base circle BC at a point Pec thereon. A line interconnecting the point Pec and the center O forms an angle $\Theta e$ with the X-axis. A line is drawn from a point P (X, Y) on the involute curve being interpolated tangentially to the base circle BC at a point Pc (Xc, Yc). A line interconnecting the point Pc and the center O forms an angle $\Theta$ with the X-axis.

Commands for interpolating the involute curve are given as:

G12.1;
G03.2X -- C -- Z -- I -- J -- R -- F -- ;
G13.1;

G12.1 is a polar coordinate interpolation command which is a modal command. After this G code is commanded, the polar coordinate interpolation remains effective until the G code is canceled.

G03.2 is a counterclockwise involute curve command. If the involute curve were clockwise, it would be commanded by G02.2. Whether the involute curve goes toward or away from the base circle depends on the coordinates of the starting and ending points of the involute curve.

X denotes the coordinates of the ending point in an orthogonal coordinate system (X, C), and C denotes the coordinates of the ending point in the orthogonal coordinate system, which are Pel (Xe, Ye) in FIG. 1. The coordinates are commanded as absolute values. The numerical values following C are commanded as Y-axis values in the XY pane, and hence are different from an actual interval by which the C-axis rotates. After the involute curve has been interpolated these values are converted to values in the polar coordinate system. Z indicates a distance of movement along the Z-axis or the coordinates of the ending point.

I -- J -- represents the values of the center of the base circle BC as viewed from the starting point Ps (Xs, Ys), and is commanded by incremental values. R -- represents the radius of the base circle BC, and F -- the speed of feed.

G13.1 is a command for canceling the polar coordinate interpolation mode. When this code is given, the polar coordinate interpolation mode is canceled, and control goes back to the normal orthogonal coordinate interpolation. The mark ; indicates the end of a block.

A calculation process for determining values required for the involute curve from the above commands will be described below.

(1) The central coordinates C of the base circle:

The coordinates of the starting point Ps (Xs, Ys) of the involute curve are not contained in commands, but are stored as a present position in a computerized numerical control apparatus. The coordinates O ($X_0$, $Y_0$) of the center of the base circle are determined from the starting points Ps (Xs, Ys) and a distance (I, J) to the center of the base circle of the involute curve as viewed from the starting point according to the following equations:

$X_0 = Xs + I$
$Y_0 = Ys + J$ (2) The angle $\Theta s$ for the starting point of the involute curve:

A line is drawn from Ps (Xs, Ys) tangentially to the base circle BC at a point Psc, and the angle formed between a line interconnecting the point Psc and the center O and the X-axis is indicated as $\Theta s$.

(3) The angle $\Theta e$ for the ending point of the involute curve:

A line is drawn from Pel (Xe, Ye) tangentially to the base circle BC at a point Pec, and the angle formed between a line interconnecting the point Pec and the center O and the X-axis is indicated as $\Theta e$.

(4) The angle $\Theta o$ for the starting point of the involute curve.

If it is assumed that the distance between the points Psc and Ps is represented by ls, then the length of the arc between the points Psc and $P_1$ is equal to the length of the straight line ls because of the definition of the involute curve. Therefore, if the length of the straight line ls is indicated by L, then the angle $\Theta l$ for the starting point of the involute curve can be determined by:

$$\Theta o = \Theta s - L/R \ (radian)$$

(5) From the above values, the coordinates of a point on the involute curve are given as follows:

$$X = R\{\cos\Theta + (\Theta - \Theta_0)\sin\Theta\} + X_0$$

$$Y = R\{\sin\Theta - (\Theta - \Theta_0)\cos\Theta\} + Y_0$$

By incrementing $\Theta$ a certain angle from $\Theta s$ to $\Theta e$, successively determining points on the involute curve IC1 according to the above equations, and linearly interpolating the points, an involute curve can be determined and interpolated. Interpolation along the Z-axis in synchronism therewith can result in interpolation of the curve to be determined.

A desired involute curve can be interpolated by incrementing $\Theta$ by certain angles in the above equations, determining three points, and interpolating them by circular interpolation. In the above description, specific commands and interpolation formulas have been explained. Basically, it is sufficient to command the direction in which an involute curve rotates, the distance by which it moves, the radius of a base circle, and the coordinates of the center of the base circle. Various formulas can be used depending on the nature of the commands. The distance by which an involute curve moves may be commanded by way of an angle through which it moves, as viewed from the center of the base circle.

In the above embodiment, the involute curve turns counterclockwise away from the base circle. However, the involute curve may turn counterclockwise toward the base circle, clockwise toward the base circle, or clockwise away from the base circle. The above equations are applicable to any of these three instances.

The interpolation pulses thus obtained on the XY plane are then converted to values on the r-c plane according to the following equations:

$$r = \sqrt{X^2 + Y^2}$$

$$c = \cos^{-1}(X/\sqrt{X^2 + Y^2}) \pm 2n\pi \ (n \text{ is an integer})$$

The interpolation pulses along the Z-axis are issued as they are as X-axis commands.

Figure 2:
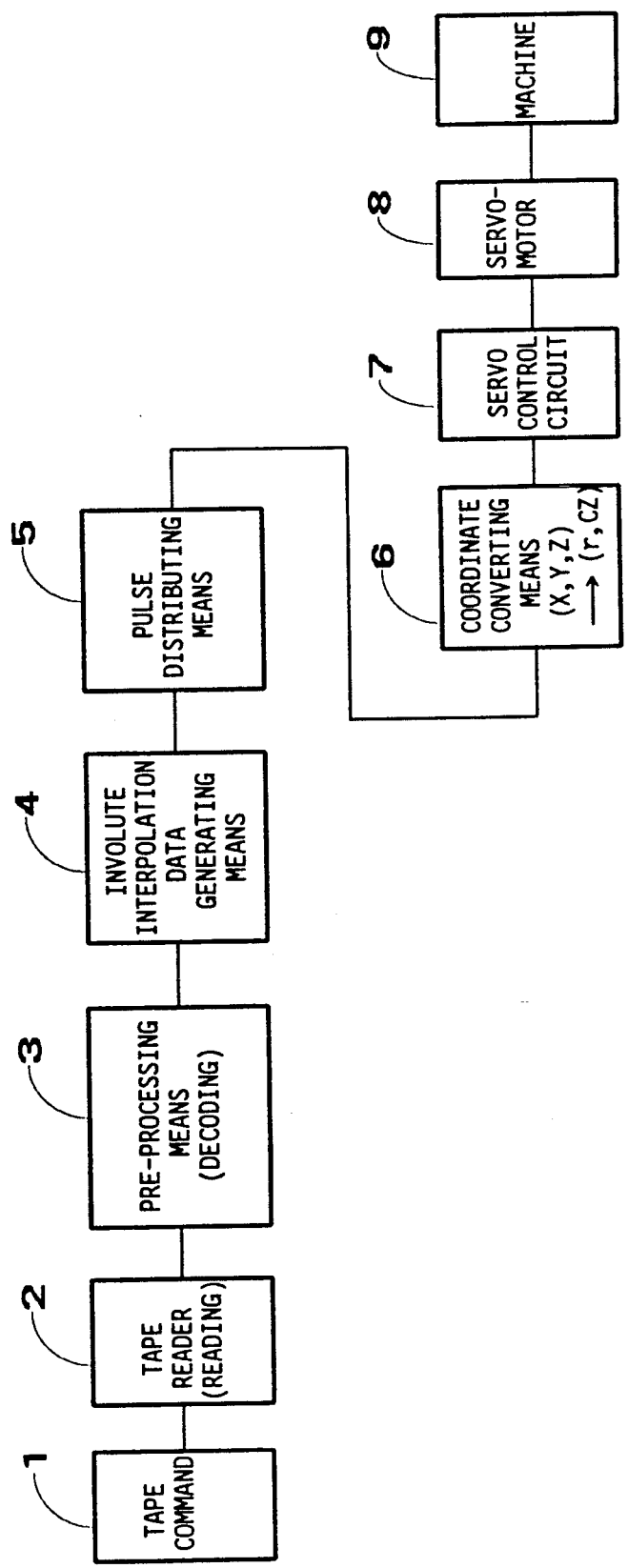
FIG. 2 is a block diagram of a numerical control apparatus used for carrying out the embodiment of the present invention.

A computerized numerical control apparatus for effecting the above involute curve interpolation will be described below. FIG. 2 schematically shows the computerized numerical control apparatus. The computerized numerical control apparatus includes a tape command 1 in the form of a tape in which the above commands are punched, a tape reader 2 for reading the tape 1, a pre-processing means 3 for determining from G codes whether there is an involute interpolation command, and an involute interpolation data generating means 4 for generating from commands data necessary for effecting the involute interpolation as described above. A pulse distributing means 5 for incrementing Θ by certain angles to determine points of an involute curve and a distance of movement along the Z-axis from the data generated in the orthogonal coordinate system by the involute interpolation data generating means 4. The pulse distributing means 5 also effects linear or circular interpolation on the determined points and distance, and issues interpolation pulses. The computerized numerical control apparatus also includes a coordinate converting means 6 for converting the interpolation pulses (X, Y) in the orthogonal coordinate system to interpolation pulses (r, c, Z) in the polar coordinate system, and a servo control circuit 7 for driving servomotors 8 with the commands to cause ball screws or the like to move a machine 9.

With the present invention, as described above, an involute curve and commands on the Z-axis are interpolated in the computerized numerical control (CNC) apparatus, and the interpolated quantities are converted to those on the rotational, linear, and Z-axes for controlling a machine tool. Accordingly, a workpiece can easily be machined along a three-dimensional involute curve on a three-axis lathe, a cam grinding machine, or the like.

What is claimed is:

1. An involute interpolation method for a computerized numerical control apparatus having a rotational axis and a linear axis, comprising the steps of:
   giving commands for a direction in which an involute curve rotates, a position of the center of a base circle, a radius (R) of the base circle and a Z-axis;
   interpolating the involute curve and a distance along the Z-axis according to the commands; and
   controlling the rotational axis, the linear axis, and the Z-axis of a machine which is to be controlled in response to said interpolating step.

2. An involute interpolation method according to claim 1, wherein said interpolating step comprises interpolating a distance of movement along the Z-axis in proportion to a distance of movement of the involute curve on a plane containing the rotational axis and the linear axis.

3. An involute interpolation method according to claim 1, wherein said interpolating step comprises interpolating a distance of movement along the Z-axis such that a tangential speed of the involute curve on a plane containing the rotational axis and the linear axis is proportional to a speed along the Z-axis.

4. An involute interpolation method according to claim 1, wherein said step of giving commands comprises giving commands in an orthogonal coordinate system and wherein said interpolating step comprises interpolating the commands in orthogonal coordinates, further comprising the step of:
   converting an interpolated distance to a distance of movement in a polar coordinate system after said interpolating step.

5. An involute interpolation method for a computerized numerical control apparatus having a rotational axis and a linear axis, comprising the steps of:
   supplying commands which define a three-dimensional involute curve, the commands comprising a direction in which an involute curve rotates, a position of a center of a base circle for locating the involute curve in a two-dimensional plane, a radius of the base circle which defines a size of the involute curve in the two-dimensional plane, and a Z-axis normal to the two dimensional plane which defines the involute curve in three dimensions;
   interpolating positions along the rotational axis, the linear axis, and the Z-axis from the commands; and
   controlling the position of a machine along the rotational axis, the linear axis, and the Z-axis according to the results of said interpolating step.

6. An involute interpolation method for a computerized numerical control apparatus having a rotational axis, a linear axis and a Z-axis, comprising the steps of:
   giving commands which define an involute curve;
   interpolating the involute curve in X, Y and z dimensions according to said commands to provide interpolated values;
   converting the interpolated values in the X, Y and Z dimensions into R, C and Z dimensions to provide converted interpolated values; and
   controlling said linear axis, rotational axis and Z-axis according to said transformed interpolated values.

* * * * *

UNITED STATES PATENT AND TRADEMARK OFFICE
CERTIFICATE OF CORRECTION

PATENT NO. : 5,065,333
DATED : November 12, 1991
INVENTOR(S) : Kawamura et al.

It is certified that error appears in the above-identified patent and that said Letters Patent is hereby corrected as shown below:

Column 1, line 36, change "There" to --Therefore--;

Column 1, line 56, change "curve rotates" to --curve is to rotate--;

Column 1, line 58, change "polate" to --interpolate--;

Column 2, line 43, delete "at";

Column 3, line 1, change "A necessary interpolated involute" to --The desired--;

Column 3, line 25, change "canceled" to --cancelled--;

Column 3, line 49, change "canceling" to --cancelling--;

UNITED STATES PATENT AND TRADEMARK OFFICE
CERTIFICATE OF CORRECTION

PATENT NO. : 5,065,333
DATED : November 12, 1991
INVENTOR(S) : Kawamura et al

It is certified that error appears in the above-identified patent and that said Letters Patent is hereby corrected as shown below:

Column 3, line 51, change "canceled" to

--cancelled--;

Column 4, line 20, delete "then", and change

"$\theta 1$" to --$\theta_0$--;

Column 6, line 43, changing "z" to --Z--.

Sigrled and Sealed this

Fourth Day of May, 1993

Attest:

MICHAEL K. KIRK

Attesting Officer

Acting Commissioner of Patents and Trademarks